(12) United States Patent
Hayden et al.

(10) Patent No.: US 10,010,948 B1
(45) Date of Patent: Jul. 3, 2018

(54) NEAR-NET SHAPED CUTTING TOOLS AND PROCESSES AND DEVICES FOR MAKING THE SAME

(71) Applicants: Matthew W. Hayden, Bloomfield, MI (US); John C. Hayden, Bloomfield, MI (US)

(72) Inventors: Matthew W. Hayden, Bloomfield, MI (US); John C. Hayden, Bloomfield, MI (US)

( * ) Notice: Subject to any disclaimer, the term of this patent is extended or adjusted under 35 U.S.C. 154(b) by 190 days.

(21) Appl. No.: 14/818,618

(22) Filed: Aug. 5, 2015

Related U.S. Application Data

(60) Provisional application No. 62/063,519, filed on Oct. 14, 2014, provisional application No. 62/087,413, filed on Dec. 4, 2014.

(51) Int. Cl.
| | | |
|---|---|---|
| *B23B 51/06* | (2006.01) | |
| *B23C 5/06* | (2006.01) | |
| *B22C 9/10* | (2006.01) | |
| *B22C 9/22* | (2006.01) | |
| *B28B 7/28* | (2006.01) | |
| *B23C 5/28* | (2006.01) | |

(52) U.S. Cl.
CPC ............... *B23B 51/06* (2013.01); *B22C 9/10* (2013.01); *B22C 9/22* (2013.01); *B23C 5/28* (2013.01); *B28B 7/28* (2013.01); *B23B 2250/12* (2013.01); *B23C 2250/12* (2013.01)

(58) Field of Classification Search
CPC ....... B23B 51/06; B23B 2250/12; B23C 5/28; B23C 2250/12; B22C 9/22; B28B 7/28
See application file for complete search history.

(56) References Cited

U.S. PATENT DOCUMENTS

| | | | |
|---|---|---|---|
| 2,986,797 A | * | 6/1961 | Aisenberg ............. B28B 7/0094 249/115 |
| 3,604,060 A | | 9/1971 | Lundstrom |
| 3,632,243 A | | 1/1972 | Mott |
| 4,009,977 A | | 3/1977 | Chao |
| 4,097,977 A | | 7/1978 | Pollner |
| 4,496,299 A | | 1/1985 | Pettersson |
| 4,655,984 A | | 4/1987 | Hinton et al. |
| 4,929,410 A | * | 5/1990 | Meyer ..................... B29C 49/50 264/533 |
| 4,934,919 A | | 6/1990 | Matsushita et al. |

(Continued)

*Primary Examiner* — Nahida Sultana
(74) *Attorney, Agent, or Firm* — Young Basile Hanlon & MacFarlane, P.C.

(57) ABSTRACT

A core pin used to create a cutting tool has at least one flute configured as an inverse shape of at least a portion of the cutting tool. Alternatively or in addition, a core pin has at least one step mold configured to form an axial surface with a stepped diameter having a diameter smaller than an overall diameter an outer axial surface of the core pin, and a radial surface between the axial surface and the outer axial surface. A core pin can include a main cooling passage mold and either a straight coolant channel mold or at least one arcuate cooling channel mold having a first end and a second end, the first end engaging the main cooling passage mold and the second end configured to create a coolant exit on a surface of the cutting tool. Carbide blanks are carbide material embedded with a core pin, and near-net shape cutting tools are created by pressing and heating the carbide blanks.

16 Claims, 12 Drawing Sheets

(56) References Cited

U.S. PATENT DOCUMENTS

| | | | |
|---|---|---|---|
| 4,937,025 A | 6/1990 | Foster et al. | |
| 5,672,365 A | 9/1997 | Ishii et al. | |
| 6,054,082 A | 4/2000 | Heide et al. | |
| 6,776,941 B2 | 8/2004 | Apte et al. | |
| 2010/0090362 A1* | 4/2010 | Hayden | B22F 3/04 |
| | | | 264/71 |
| 2014/0001715 A1* | 1/2014 | Pappu | B23B 31/02 |
| | | | 279/143 |
| 2015/0209987 A1* | 7/2015 | Nedachi | B29C 45/4407 |
| | | | 425/577 |
| 2015/0314506 A1* | 11/2015 | Stumpf | F16B 37/122 |
| | | | 264/275 |
| 2015/0360295 A1* | 12/2015 | Haimer | B23B 31/1115 |
| | | | 279/20 |
| 2016/0067785 A1* | 3/2016 | Wang | B23B 27/141 |
| | | | 407/11 |

\* cited by examiner

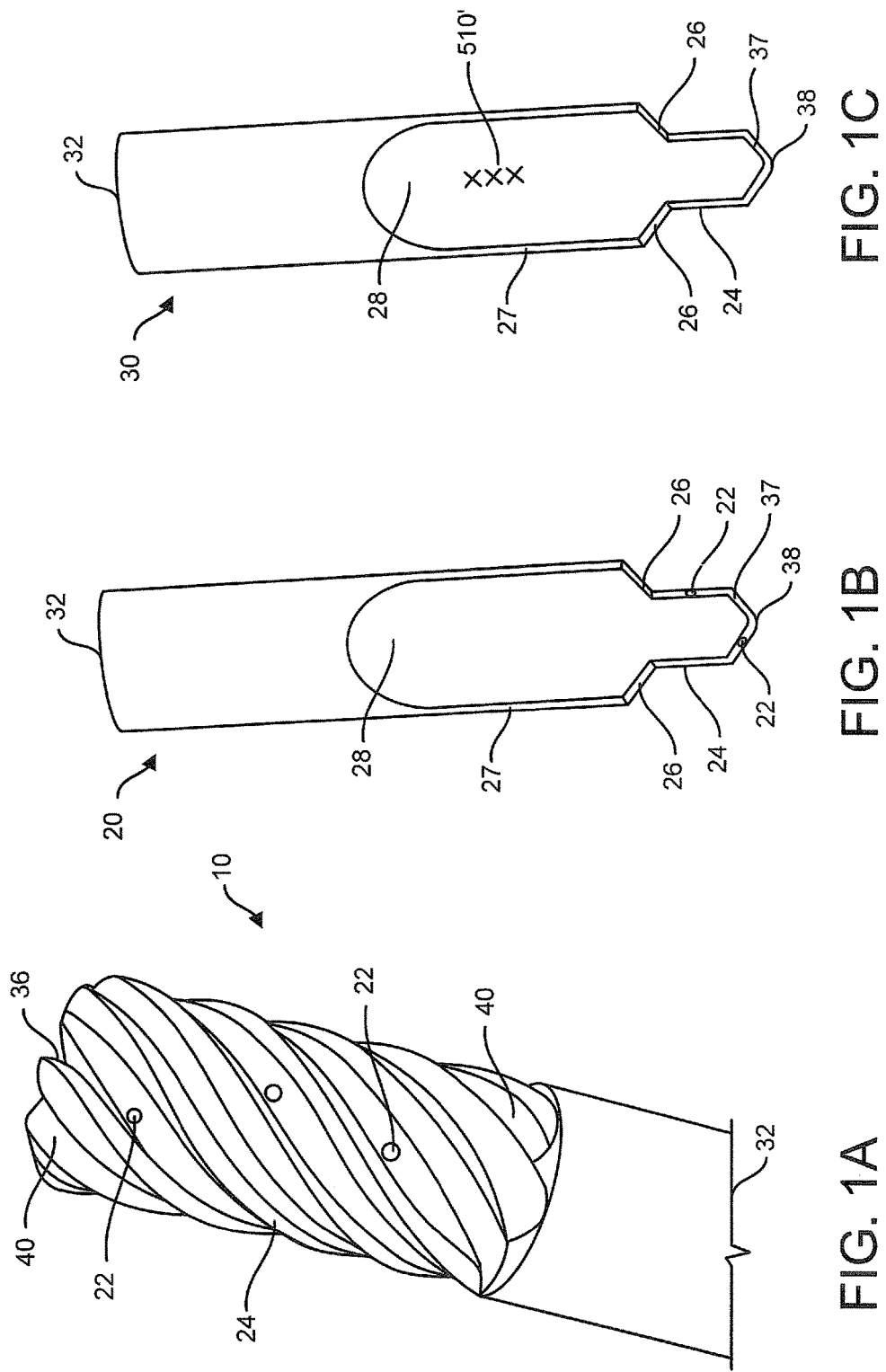

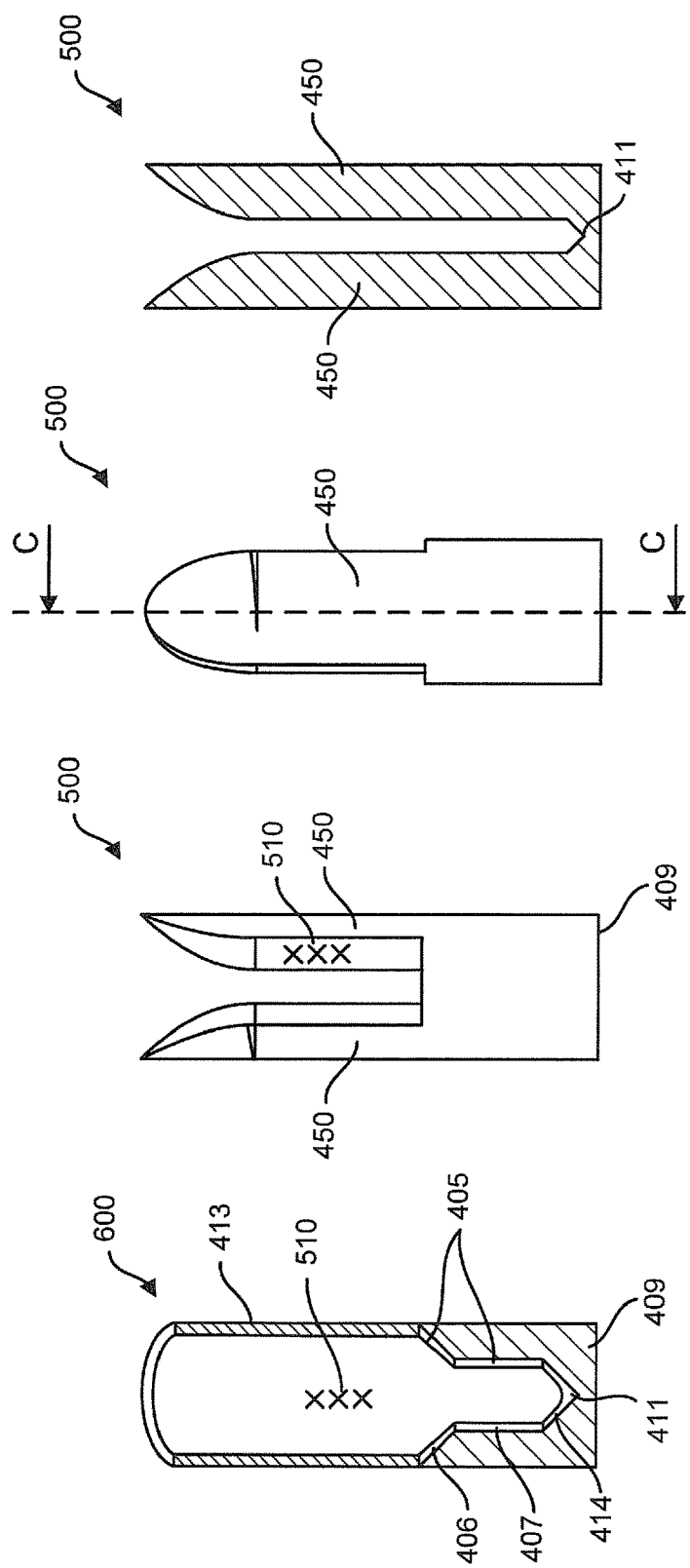

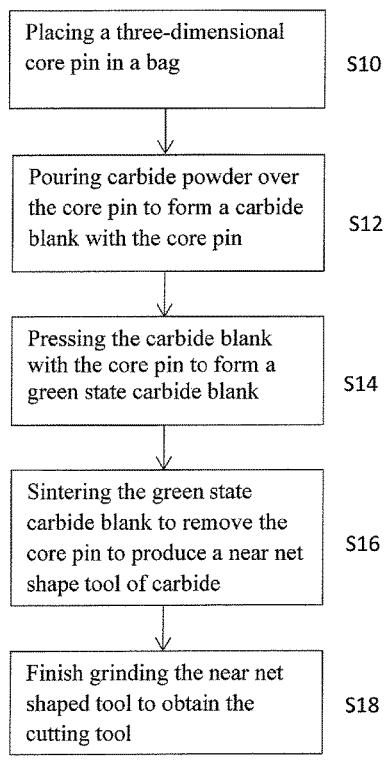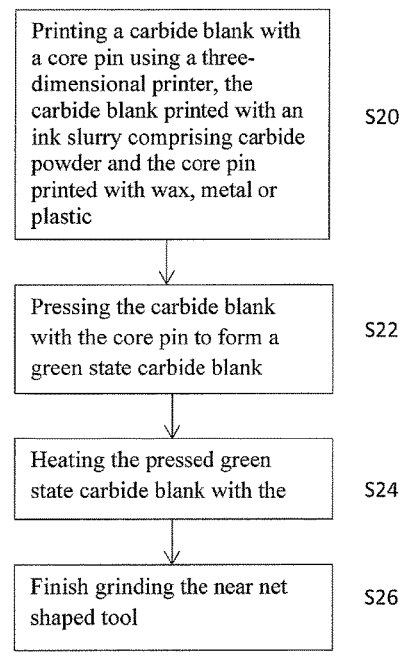
FIG. 14
FIG. 15

NEAR-NET SHAPED CUTTING TOOLS AND PROCESSES AND DEVICES FOR MAKING THE SAME

CROSS REFERENCE TO RELATED APPLICATIONS

Priority is claimed to Provisional Patent Application Nos. 62/063,519 filed on Oct. 14, 2014 and 62/087,413 filed on Dec. 4, 2014, the entire contents of which are incorporated by reference as a part of this disclosure.

TECHNICAL FIELD

The present invention relates to cutting tools and near-net shape cutting tools having one or both of a step profile and radial, non-linear cooling channels, and to processes and devices for making the near net cutting tool.

BACKGROUND

Machine cutting tools can be produced from a variety of materials, including but not limited to carbon steel, high-speed steel, cobalt high-speed steel, tungsten carbide, ceramic and the like. Cutting tools made from cobalt and/or carbide can withstand higher operating temperatures and can thus be run at higher cutting speeds and feeds than tools made from carbon steel or high-speed steel. Cutting tools containing cobalt and/or carbide, however, may be more time consuming and costly to produce than tools made from carbon steel or high-speed steel due to the increased hardness of the materials.

Cutting tools can have cooling channels to direct coolant through the tool to the work area. Coolant channels along the tool's longitudinal axis may be extruded with the tool, providing coolant exits at the axial end or ends of the tool. Radial coolant exits are very difficult to produce in carbide tools as they must be drilled into the tool after the tool is formed.

Cutting tools can have steps and points that require much machining to obtain the correct shape and uniform surfaces. This machining can be expensive and time consuming.

SUMMARY

Disclosed herein are core pins used to create carbide blanks and near-net shaped tools having shapes and coolant channels that cannot be created with extrusion or drilling. One example of a core pin used to create a cutting tool comprises a main cooling passage mold and at least one arcuate cooling channel mold having a first end and a second end, the first end engaging the main cooling passage mold and the second end configured to create a coolant exit on one or both of a radial surface and an axial surface of the cutting tool.

Another embodiment of a core pin used to create a cutting tool comprises at least one flute configured as an inverse shape of at least a portion of the cutting tool. The core pin can further include a main cooling passage mold and either a straight coolant channel mold or at least one arcuate cooling channel mold having a first end and a second end, the first end engaging the main cooling passage mold and the second end configured to create a coolant exit on one or both of a surface or a tip of the cutting tool.

Another embodiment of a core pin used to create a cutting tool comprises at least one step mold configured to form an axial surface with a stepped diameter having a diameter smaller than an overall diameter an outer axial surface of the core pin, and a radial surface between the axial surface and the outer axial surface. One or both of the radial surface and the axial surface with the stepped diameter can have an angled surface with respect to a respective radial axis and longitudinal axis.

Another embodiment of a core pin used to create a cutting tool comprises a tip mold configured as an inverse shape of a tip of the cutting tool.

Also disclosed herein are carbide blanks made with the core pins disclosed herein and near-net shape tools made with the carbide blanks and core pins disclosed herein.

Also disclosed are methods of manufacturing a core pin as disclosed herein. One such method comprises printing with a 3D printer the core pin.

Also disclosed are methods of manufacturing a carbide blank and a near-net shape cutting tool as disclosed herein. An embodiment of manufacturing the carbide blank and near-net shaped tool as disclosed herein comprises printing with a 3D printer the core pin and the carbide material together, producing the carbide blank embedded with the core pin. The core pin can be printed with an ink comprising wax or other material as disclosed herein and suitable for use as a core pin with viscosity enabling printing. Ink is prepared from carbide powder with other constituents as needed, such as wax, to print the carbide portion of the blank. The carbide blank having the embedded core pin are printed directly with the 3D printer, with the core pin providing the main cooling channel mold, any axial and/or radial arcuate or linear cooling channel molds, flute molds, step molds, point molds, center indicators, indicator lines and center point molds to be formed in the tool.

Another embodiment of a method of making a carbide blank and near-net shaped tool comprise printing with a 3D printer a carbide blank, wherein the 3D printer does not print the core pin embedded within the carbide material, but rather leaves internal voids that mimic the configuration of the core pin. In other words, the 3D printer prints the carbide blank using only the carbide material ink, with the 3D printer leaving voids where the core pin would have been printed. This carbide blank can be encapsulated in a medium to fill all of the voids, the medium melting, vaporizing or otherwise capable of leaving the voids. This encapsulated carbide blank is then pressed to achieve the requisite density, and the medium is removed. The carbide blank can be heated to remove the medium if required to remove the medium.

BRIEF DESCRIPTION OF THE DRAWINGS

The present invention will become more fully understood from the detailed description and the accompanying drawings, wherein:

FIGS. 1A-1C are perspective views of near-net shape cutting tools made with different core pins as disclosed herein;

FIGS. 11A-C are views of another embodiment of a core pin having flutes as disclosed herein;

FIG. 12 is a cross sectional view of another embodiment of a core pin having a step mold as disclosed herein;

FIG. 14 is a flow diagram of a process of making a near-net shaped tool as disclosed herein;

FIG. 15 is a flow diagram of another process of making a near-net shaped tool as disclosed herein.

DETAILED DESCRIPTION OF EMBODIMENTS

The following description of the preferred embodiment is merely illustrative in nature and is in no way intended to limit the disclosed subject matter, its applications, or its uses.

Disclosed herein are devices and methods for manufacturing cutting tools, and in particular carbide cutting tools. Carbide cutting tools must have a requisite density to be able to withstand cutting different materials throughout the life of the cutting tool. Carbide cutting tools require very high pressure and heat to achieve the desired density and hardness of the tool, and require significant machining when made with conventional processes to obtain the required shape, surfaces and tip. Many cutting tools have cooling channels that allow a coolant to run through the tool and out toward a cutting surface of the tool. These cooling channels are conventionally extruded or drilled into the tool. Extrusion and drilling both limit the cooling channels to straight line channels, limiting the locations on the tool surfaces that cooling outlets can be formed. Many cutting tools have stepped surfaces, curved surfaces and points that must conventionally be machined into the pressed and heated blank.

A variety of configurations of cutting tools can be made with the devices and processes disclosed herein, such as end mills, reamers, twist drills, straight flute drills, and the like. These cutting tools can have overall shapes and coolant channel shapes that are not obtainable with conventional methods. The cutting tools may be formed from materials known to be used in the production of cutting tools, such as powdered carbide mixtures. One such carbide mixture consists of finely ground carbide and cobalt combined with one or more binder materials, such as wax. The binder material operates to hold the particles of material together when forming the carbide mixture into a desired shape. The carbide mixture may include, for example, 90% carbide, 9% cobalt, and 1% other trace elements by volume.

Figure 2:
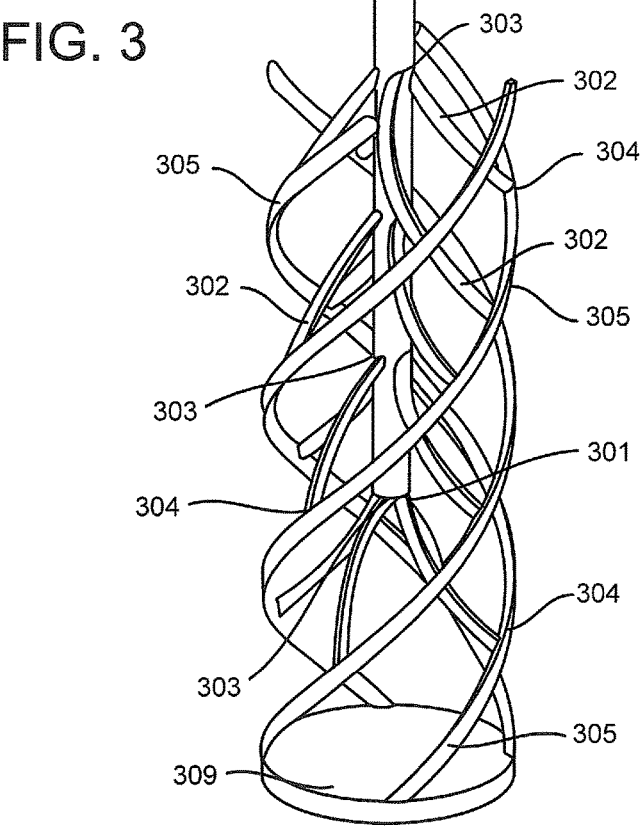
FIG. 2 is a perspective view of a core pin configured to create arcuate coolant channels in a cutting tool as disclosed herein.

FIGS. 1A-1C illustrate near-net shape cutting tools 10, 20, 30 that can be produced using the embodiments disclosed herein. Near net-shape cutting tools 10, 20, 30 are merely examples of the various types of cutting tools that can be produced using the embodiments disclosed herein. FIG. 1A illustrates a near-net shape cutting tool 10 made with the core pin shown in FIG. 2. FIG. 1B illustrates a near-net shape cutting tool 20 made with core pin shown in FIG. 8. FIG. 1C illustrates a near-net shape cutting tool 30 made with core pin shown in FIGS. 11A-11D. A near-net shape cutting tool refers to a tool produced by the methods disclosed herein. The near net shape cutting tool will likely require different degrees of finish grinding depending on the core pin used, the process used and the shape of the finished product. Near-net shape cutting tools will not require machining that is required with conventionally made cutting tools.

Near-net shape cutting tools 10, 20 each includes an elongated internal passage (not shown) oriented along its central longitudinal axis for supplying a coolant through the passage and out through coolant exits 22. Cooling passage includes an inlet port located in an end 32 of the near-net shape cutting tool 10, 20. Each coolant exit 22 is in fluid communication with the cooling passage via an arcuate or multi-arcuate coolant passage created using the core pins disclosed herein. As used herein, arcuate refers to a non-linear channel having an arc or bow shape from the inlet of the channel to the exit of the channel. As used herein, multi-arcuate refers to a non-linear channel having more than one arc shape along the length of the channel between the inlet and the exit of the channel. The coolant exits 22 can be formed in any surface of the near-net shape cutting tool 10, 20. FIG. 1A illustrates coolant exits in the axial surface 24 of the tool 10. Although the axial surface has grooves, and the surface through which the coolant exits may not face directly axial, the surface 24 as shown in FIG. 1A is considered an axial surface herein. An axial surface as used herein is a surface that is substantially parallel to a longitudinal axis of the tool. FIG. 1B has both axial surfaces 24 and radial surfaces 26. The ability to provide coolant exits along the radial surfaces, axial surfaces and/or axial ends of a cutting tool provides many benefits. A radial surface as used herein is a surface that is generally parallel to or oblique to a radial axis of the tool. Coolant can keep the work piece at a stable temperature (critical when working to close tolerances and drilling or milling deep holes), maximize the life of the cutting tip or cutting edges by cooling the tool and lubricating the working surface, assist in evacuating chips, and extend the life of the tool, resulting in lower cost per hole, among other benefits.

Near-net shape tools 20, 30 each can include a non-linear surface 28 as well as a stepped diameter axial surface 24, with a radial surface 26 extending between the stepped diameter axial surface 24 and an outer axial surface 27 of the tool. A near-net shape tool 20, 30 can also include a tip surface 37 and a tip 38. These surfaces are difficult to create with conventional cutting tool manufacturing processes. The near-net shaped cutting tools disclosed herein can combine one or more of the arcuate coolant channels, multi-arcuate cooling channels, non-linear shaped surfaces, tips and stepped surfaces.

The near-net shaped cutting tools 10, 20, 30 disclosed herein can be manufactured using embodiments of the core pins disclosed herein. A core pin is a mold used to create the arcuate coolant channels, multi-arcuate cooling channels, non-linear shaped surfaces, tips and stepped surfaces of the near-net shape tools. FIGS. 2 and 5-7 illustrate core pin 300. The core pin 300 includes a coolant main passage mold 320 that will create the main coolant passage in the near-net shape cutting tool along the cutting tool's central longitudinal axis. As illustrated, the coolant main passage mold 320 ends at end 301 a distance before the end 36 of the near-net shape cutting tool.

Figures 3, 4:
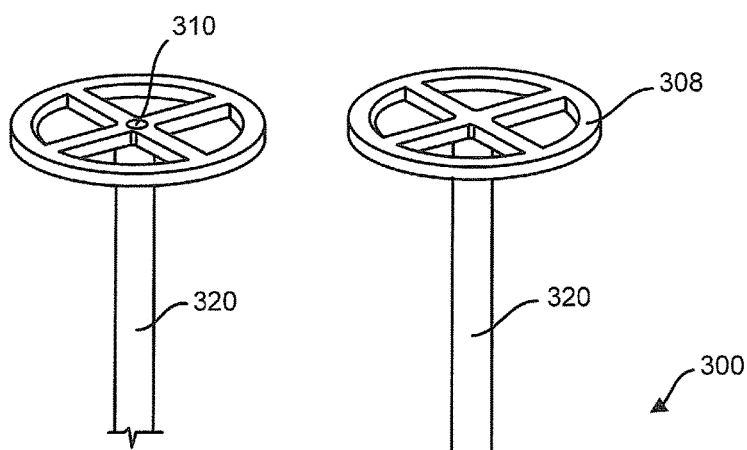
FIG. 3 is a partial perspective view of another aspect of a core pin as disclosed herein.
FIG. 4 is a side view of a place holder used with some embodiments of the core pins disclosed herein.

FIG. 3 illustrates an alternative core pin 300 having a coolant main passage mold 320 with a hollow channel 310 configured to receive a place holder 311, shown in FIG. 4, inserted into the hollow channel 310 before pressing the carbide over the core pin 300. The place holder 311 is removed prior to heating. Incorporating the place holder 311 into the hollow channel 310 of the coolant main passage mold 320 maintains the shape of the coolant main channel during pressing. Having the hollow channel 310 during heating, as opposed to a solid coolant main passage mold 320, provides a void during heating to accommodate any expansion, thereby preventing cracking. The place holder 311 can be a metal or ceramic rod, as a non-limiting example. The place holder 311 can be of a length sufficient to extend to the coolant main passage mold end 301 and to extend from the hollow channel 310 to be accessible for removal.

The core pin 300 has multiple radial arcuate cooling channel molds 302 extending from various positions along the coolant main passage mold 320. Each radial arcuate cooling channel mold 302 is in fluid communication with the coolant main passage mold 320 at a first end 303 and provides a fluid channel exit at its second end 304, creating the coolant exits 210 such as those shown on the axial surface 24 of the near-net shape cutting tool 10 in FIG. 1A. This cannot be achieved with current methods and devices, such as extrusion and drilling of coolant channels.

The core pin 300 can include indicator lines 305. These indicator lines 305 form channels in the surface of a near-net shape cutting tool providing a guide for the finish grinding of the grooves in the cutting surfaces. The indicator lines 305 also maintain the arcuate shape of the cooling channel molds 302 and maintain the position of the second end 304 of the coolant channels molds 302 during the molding process. Alternatively, flutes may be used instead of the indicator lines 305 to form grooves in the surface of a near-net shape cutting tool, such as the grooves 40 shown in FIG. 1A, without the need to grind the grooves along the channels left by indicator lines. The flutes provide the requisite size and shape of the grooves. The flutes also maintain the arcuate shape of the cooling channel molds 302 and maintain the position of the second end 304 of the coolant channels molds 302 during the molding process.

When the core pin 300 is used with a bag or sleeve in a molding process such as that as described in U.S. Pat. No. 8,147,736, the core pin 300 also includes a centering member 308 to keep the core pin 300 centered in the bag or sleeve for pressing. The centering member 308 is illustrated as a wagon wheel, but this is an illustrative example. The centering member 308 can be any design, so long as its diameter allows the core pin 300 to be positioned in the bag or sleeve used during pressing without moving to ensure that the coolant main passage is centered on the central longitudinal axis of the near-net shaped cutting tool. In addition, the centering member 308 must have openings to allow for the powder to be poured into the bag or sleeve when such a process is used for the manufacture of the near-net shaped tool. The core pin 300 also has a tip end 309 which has a diameter corresponding to the diameter of the centering member 308 to ensure that the core pin 300 stays centered along the longitudinal axis, reducing or eliminating the amount of powder that fills in between the indicator lines and the bag.

Figure 5:
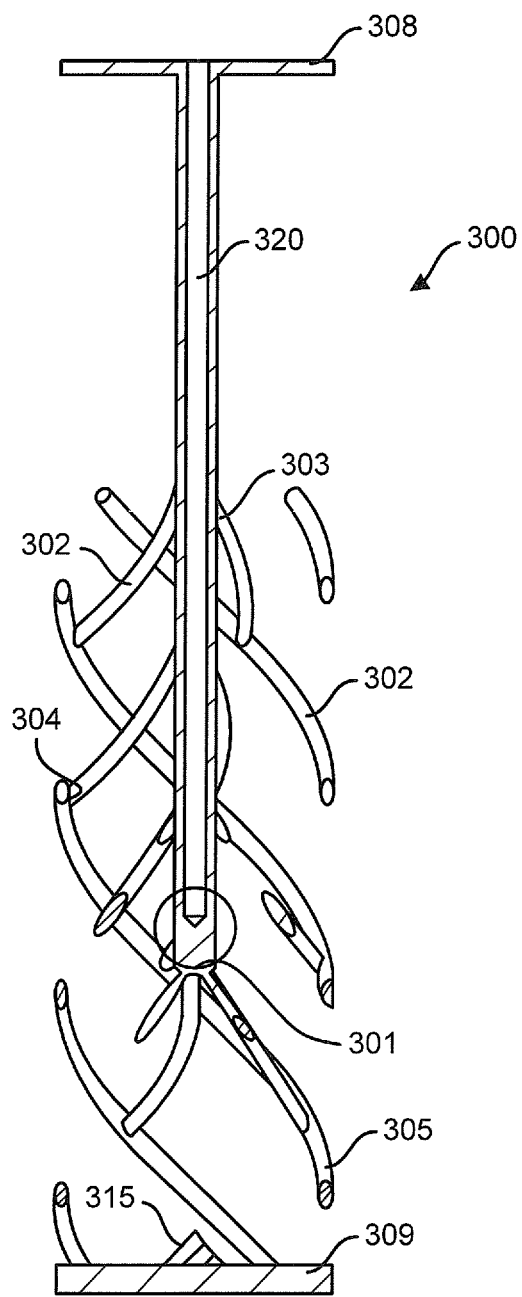
FIG. 5 is a side cross sectional view of the core pin cut along a longitudinal central axis.
Figure 6:
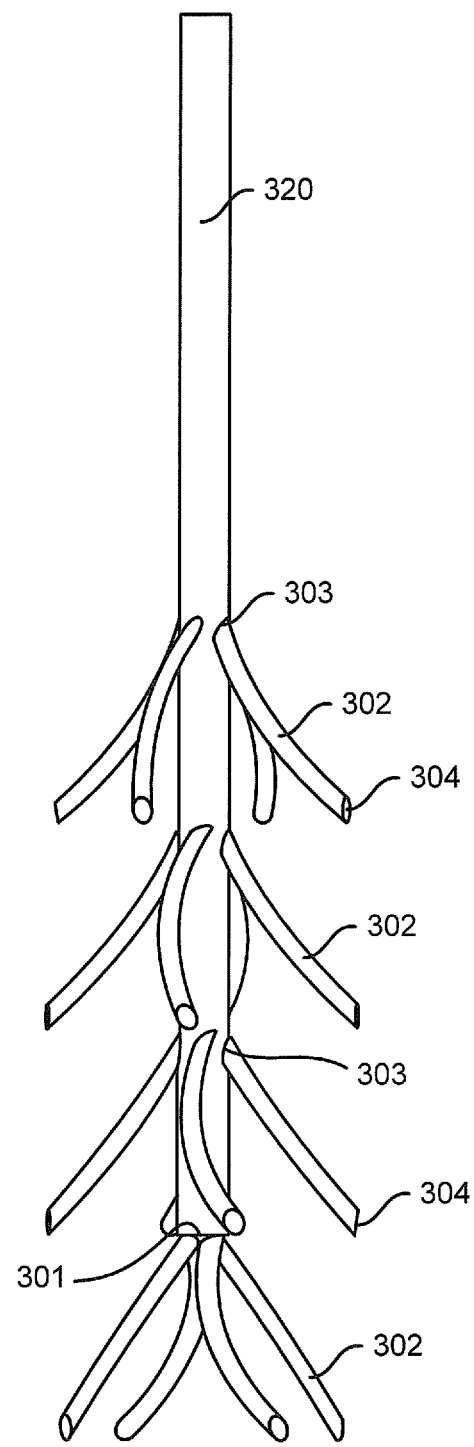
FIG. 6 is a perspective view of a core pin without indicator lines, emphasizing the arcuate radial coolant channels.
Figure 7:
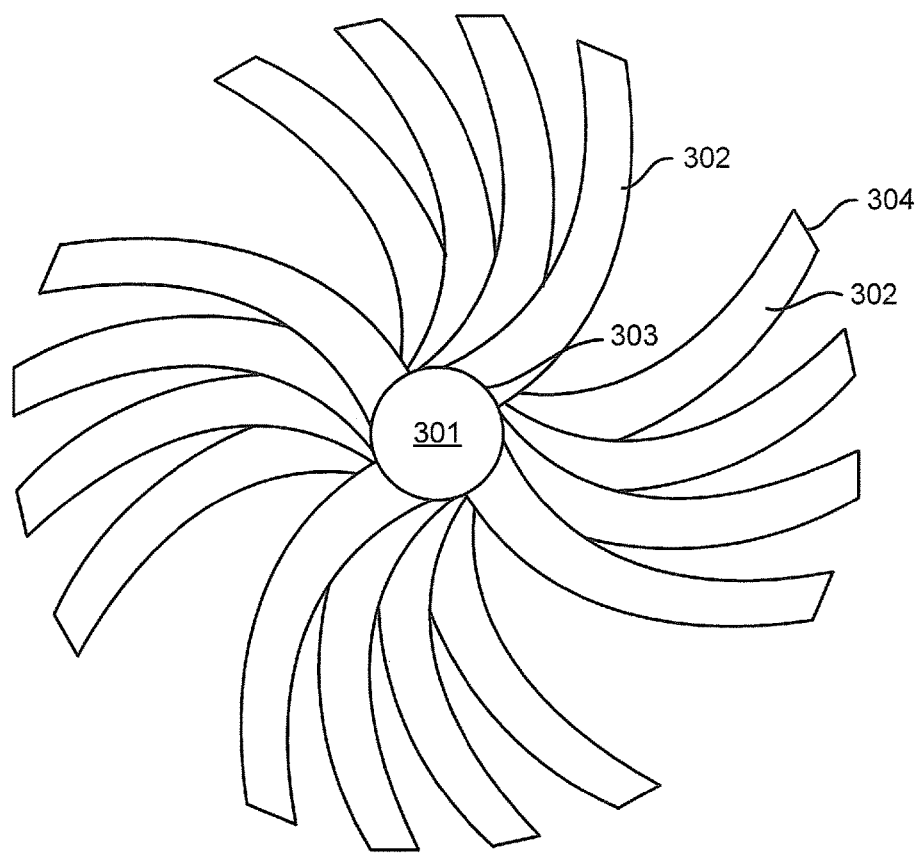
FIG. 7 is a bottom view of the core pin of FIG. 6.

The core pin 300 can incorporate center indicators 315 where needed. The center indicators 315 can be male or female. The center indicator shown in FIG. 5 is female, as it creates a female center indicator on the near-net shape tool. The center indicators 315 identify the center on each end of the near-net shape tool so that the near-net shape tool can accurately be aligned in a finish grinding machine. The core pin 300 may have center indicators 315 inherent in its design. For example, the core pin 300 shown in FIG. 5 has an inherent female center indicator in the hollow channel 310.

Figure 8:
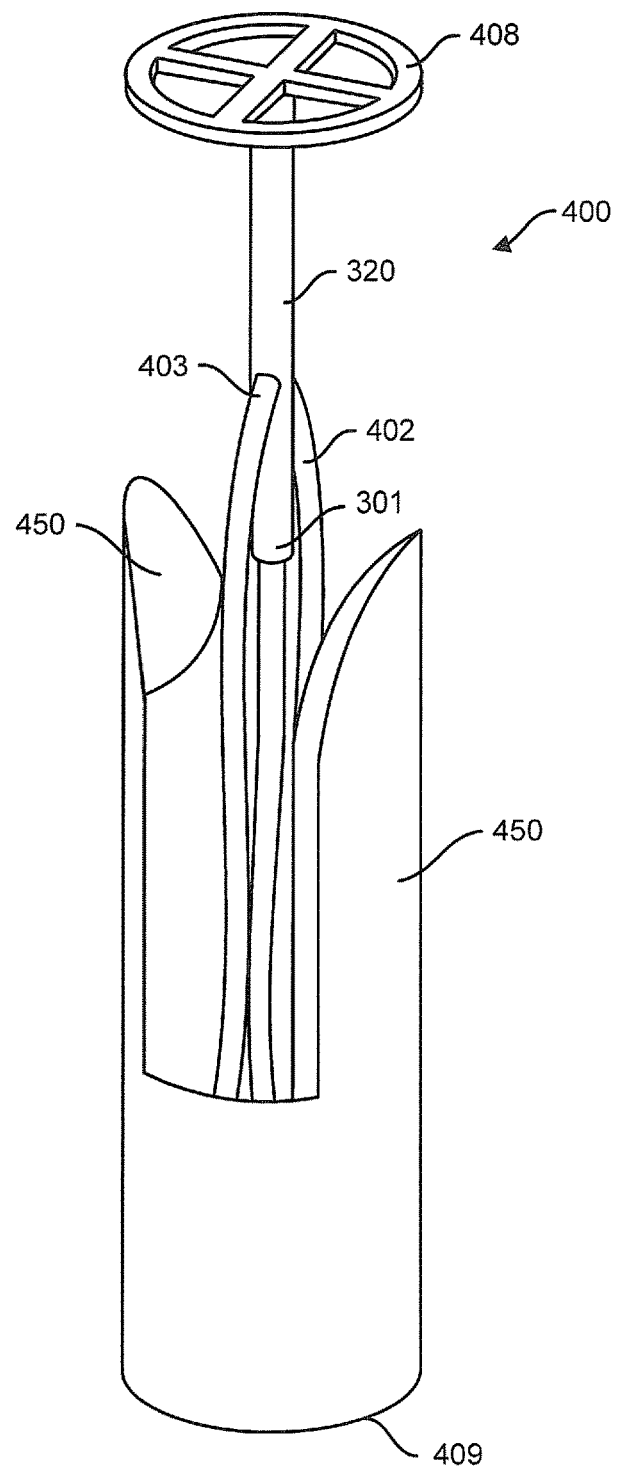
FIG. 8 is a side perspective view of another embodiment of a core pin for creating multi-arcuate coolant channels and flutes as disclosed herein.
Figure 9:
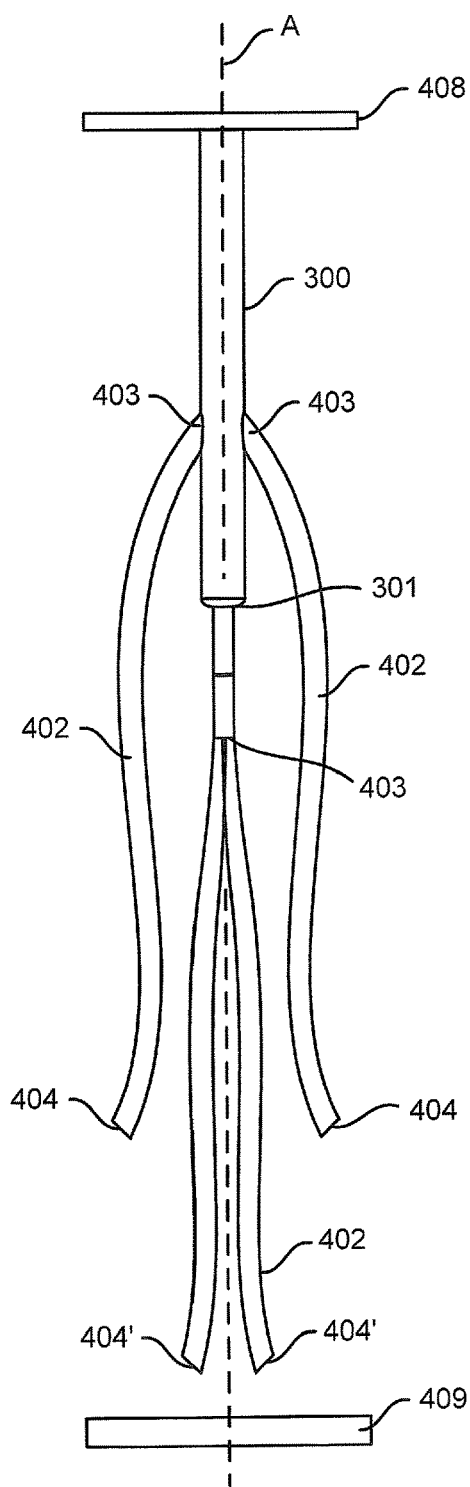
FIG. 9 is a side view of the core pin in FIG. 8 with the flutes removed.
Figure 10:
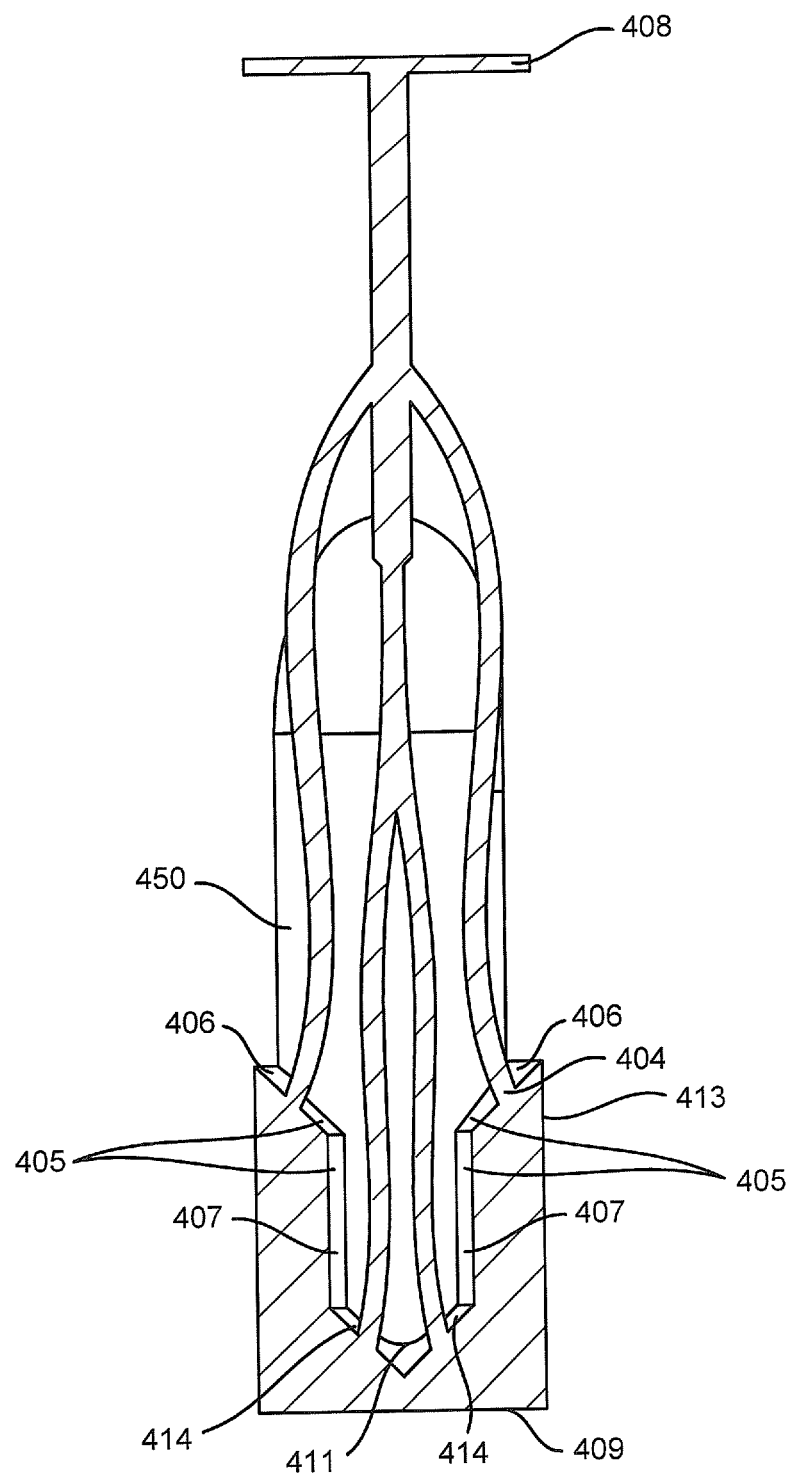
FIG. 10 is cross sectional view of the core pin of FIG. 8 along a central longitudinal axis.

FIGS. 8-10 illustrate another example of a core pin 400 used to create a cutting tool as disclosed herein. Like reference numerals will be used to refer to like elements. The core pin 400 has a coolant main passage mold 320 that will create the coolant passage in the cutting tool along the cutting tools central axis. As illustrated, the coolant main passage mold 320 has an end 301 along the central longitudinal axis A of the cutting tool and core pin 400. The coolant main passage mold 320 can have a hollow core 310 as discussed with reference to FIG. 3. The core pin 400 has multiple axial multi-arcuate cooling channels molds 402 extending from various positions along the coolant main passage mold 320. Each axial multi-arcuate cooling channel mold 402 is in fluid communication with the coolant main passage mold 320 at a first end 403 and provides a fluid channel exit on either an axial surface or a radial surface of the cutting tool at second end 404 that is in a radially different position than the first end 403, meaning that the radial distance between the first end and the central longitudinal axis of the cutting tool or core pin 400 is a different distance than the radial distance between the second end 404 and the central longitudinal axis. This cannot be achieved with current methods and devices.

The core pin 400 has a step mold 405, shown in FIG. 10. The step mold creates a stepped diameter axial surface 407 and a radial surface 406 between the stepped diameter axial surface 407 and an outer axial surface 413. As illustrated in FIG. 10, one step mold 405 on either side of a flute 450 is included; however, more than one step mold 405 can be used along the longitudinal axis. A coolant exit is created with second ends 404 on each of the radial surfaces 406 and a coolant exit is created with second ends 404' on each of a tip surface 414. This configuration is provided as an example only and is not meant to be limiting. One or more of the stepped diameter axial surfaces 407 can be angled, and one or more of the radial surfaces 406 can be angled, as illustrated in FIG. 10. Conventional methods of obtaining stepped axial and radial surfaces as illustrated herein require that the surfaces be grinded into the tool. With the core pin 400 and methods disclosed herein, the stepped diameter axial and radial surfaces 406, 407 are created with the step mold 405 and only require finish grinding. The core pin 400 also provides for forming a tool tip 411, which conventionally must be grinded after molding. This is best seen in FIGS. 10, 1B and 1C.

With any coolant channel mold 302, 402 described herein, variations as desired or required can be easily incorporated into the design of the core pin 300, 400. As an example, the coolant channel mold 302, 402 can be made to form the coolant channel into any non-circular shape along at least a portion of the length of the channel. To illustrate, the second ends 304, 404 can be formed into any shape, such as a star, oval, letter, so that the coolant channel exit in the near-net shaped tool as viewed from the user of the tool has such a shape. It is a way to personalize or brand the cutting tools.

When the core pin 400 is used with a bag or sleeve in a molding process such as that as described in U.S. Pat. No. 8,147,736, the core pin 400 also includes a centering member 408 to keep the core pin 400 centered in the bag or sleeve for pressing. The centering member 408 is illustrated as a wagon wheel, but this is an illustrative example. The centering member 408 can be any design, so long as its diameter allows the core pin 400 to be positioned in the bag or sleeve without moving to ensure that the coolant main passage is centered on the longitudinal axis of the tool. In addition, the centering member 408 can have openings to allow for the powder to be poured into the bag or sleeve. The core pin 400 also has a tip end 409 which has a diameter corresponding to the diameter of the centering member 408 to ensure that the core pin 400 stays centered along the longitudinal axis, reducing or eliminating the amount of powder that fills in between the indicator lines and the bag, to keep core pin central for finish grinding.

Although not shown, core pin 400 can include the use of the place holder 311 and center indicators 315 as described above with reference to core pin 300.

Core pin 400 also includes flutes 450. The flutes 450 can be any shape desired or required. The flutes 450 are the inverse shape of the desired finished tool. The flutes 450 enable the molding method to produce a near net shape cutting tool, requiring much less machining to produce the finished tool than current methods require, reducing labor, time and overall cost of the tools. As illustrated best in FIG. 8, the flutes 450 can be symmetrically formed and can produce a curved surface in the near-net shaped tool that would be very difficult to obtain with machining.

FIGS. 11A-11C illustrate another embodiment of a core pin 500 that produces a cutting tool without coolant channels. Core pin 500 has flutes 450 and the tip 411 as described above with respect to core pin 400, so the description will not be repeated here. However, the shape of the flutes 450 and the tip are provided by way of example and are not meant to be limiting. Although two flutes 450 are illustrated, it is contemplated that one flute 450 or any multiple flutes 450 can be included. Flutes 450 included in one core pin do not have to be the same shape. Flutes 450 can be symmetrical about the central longitudinal axis or can be asymmetrical. It should be noted that although only centering member 409 is included, centering member 408 can be included in the core pin 500 if required.

As illustrated in FIG. 11A, one or more of the surfaces of the core pin 500 can include embossing of insignia 510, illustrated here as XXX. The insignia 510 can be anything desired or required, such as a name, logo, design, part number, patent number, etc. The embossed insignia 510 is illustrated on the flute 450 in FIG. 11A and will produce the insignia 510' on the corresponding surface of the near-net shape tool, as illustrated in FIG. 1C.

FIG. 12 illustrates yet another embodiment of a core pin 600 that produces a cutting tool without coolant channels. Core pin 600 has a step mold 405 as well as a tip 411 as described above with respect to core pin 400, so the description will not be repeated here. However, the shape of the step mold 405 and the tip 411 are provided by way of example and are not meant to be limiting. The step mold 405 can be of a consistent profile around the circumference of the core pin 600 or can have a varying profile. More than one step mold 405 can be included along a longitudinal axis. It should be noted that although only centering member 409 is included, centering member 408 can be included in the core pin 600 if required.

One or more of the surfaces of the core pin 600 can include embossing of insignia 510, illustrated here as XXX. The insignia 510 can be anything desired or required, such as a name, logo, design, part number, patent number, etc. The embossed insignia 510 will produce the insignia on the corresponding surface of the near-net shape tool.

Disclosed herein are processes for making the core pin, a carbide blank of the cutting tool, and a near-net shaped cutting tool. As used herein, a carbide blank is a member incorporating the carbide material and either the core pin or voids replicating the core pin, prior to pressing and heating. The near-net shaped cutting tool is a member that has been pressed and/or heated, with only finish grinding needed to form the cutting tool.

The core pins can be made using a 3D printer in step S10, for example. The core pins are made using material that will hold its shape during the molding process under pressure and fluidize or disintegrate upon heating of the molded product. Examples of the material are wax, plastic and metal. The material can either turn to a liquid and flow out of the heated tool or can vaporize when heated, for example. The core pins disclosed herein are examples. Core pins can be printed in any configuration desirable to provide cutting tools with any number of non-linear cooling channel configurations one or both of the radial and axial surfaces. Of course, linear channels can be made if desired or required. Core pins can be designed for individual tools, or one or more batches of core pins can be printed to make a plurality of the same tool.

Figure 13:
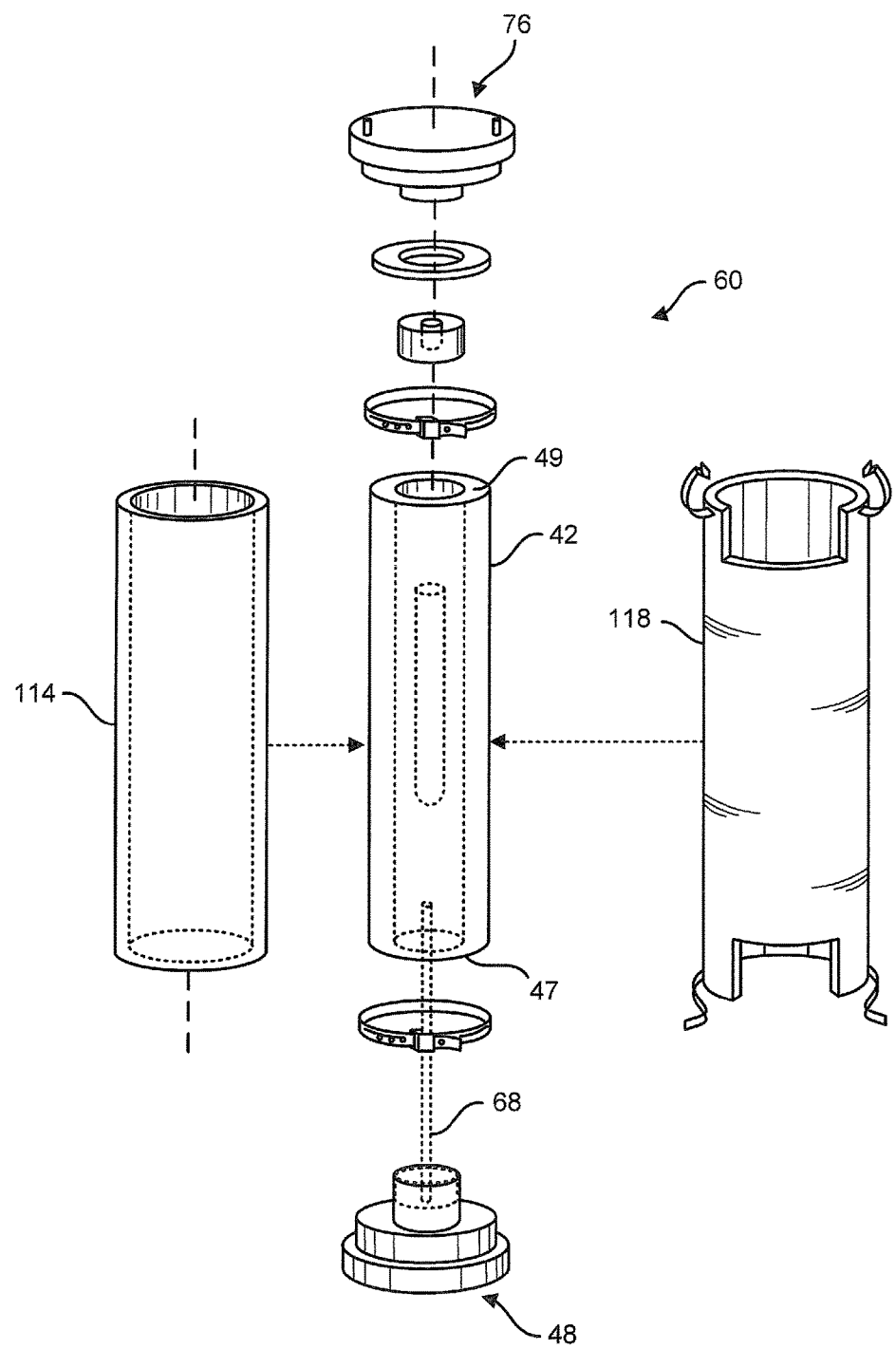
FIG. 13 is an exploded perspective view of a manufacturing mold for a cutting tool as disclosed herein.

Carbide blanks and near-net shaped tools can be made with the mold 60 and process disclosed in U.S. Pat. No. 8,147,736. FIG. 13 illustrates the bag or sleeve that can be used to make the carbide blank and near-net shaped tool. As shown in FIG. 14, the method of molding disclosed herein can comprise placing a three-dimensional core pin 300, 400, 500 in a bag or sleeve in step S10, adding carbide powder to the bag or sleeve containing the core pin to produce a carbide blank with a core pin embedded in it in step S12, pressing the carbide blank with the core pin to produce a green state carbide blank in step S14, sintering the green state carbide blank to remove the core pin and harden the green carbide blank to the near net shape tool in step S16. The Near-net shaped tool can then be finish grinded to obtain the finished cutting tool in step S18.

The mold 20 used to manufacture the disclosed carbide blanks and near-net shape cutting tools is described as reference only to provide context to one way the disclosed core pin can be used to create the disclosed cutting tools. The configuration of the mold is one example and is not meant to be limiting. Referring back to FIG. 13, mold 60 includes a generally cylindrical-shaped bag 42 having a first end 47 and a second end 49. Bag 42 has a hollow interior cavity 44. For purposes of illustration, bag 42 is shown to have an interior profile corresponding to straight flute drill 22. It shall be appreciated, however, that bag 42 may also include a different interior profile depending on the particular cutting tool being produced. It shall also be understood the dimensions and/or profile of the cutting tool formed using bag 42 may differ from those of interior cavity 44. The dimension of interior cavity 44 may be larger than the resulting cutting tool due to compacting of the carbide material used to produce the cutting tool during the forming process. Bag 42 preferably has a generally cylindrical shape with a circular cross-section. Other cross-sectional shapes, however, may also be used with satisfactory results, such as octagonal, hexagonal, and the like. Bag 42 is preferably made from a resilient elastic material having a Durometer hardness of approximately 35-40, such as urethane, silicone, or another material having similar physical characteristics. It is preferable the bag material be capable of withstanding multiple compression cycles involving compressive loads in excess of 30,000 psi without incurring any appreciable degradation of the physical properties of the material. It is also preferable the bag material not incur a permanent set as a result of the compressive loads.

Mold 60 includes a first end cap 48 for sealing end 47 of bag 42. Engaging the end cap 48 is a core pin 68 as disclosed, shown in broken line to represent any contemplated core pin design. Mold 60 further includes a second end cap 76 for sealing end 49 of bag 42 to prevent fluid from entering cavity 44 from the exterior of bag 42.

Mold 20 may also include a fill sleeve 114 and a pressure sleeve 118. The two sleeves are not used simultaneously, with each serving a separate function. With end cap 76 removed from bag 42, fill sleeve 114 can be positioned over bag 42 prior to filling bag 42 with a powdered carbide mixture, or a like material having properties suitable for producing cutting tools. Filling bag 42 with carbide mixture may cause bag 42 to expand due to the bag's elastic nature. Fill sleeve 114 operates to limit the amount of expansion that may occur during the filling process.

Pressure sleeve 118 can be positioned over bag 42 so as to enclose at least a portion of the exterior periphery of bag 42. Pressure sleeve 118 provides support for bag 42 and helps maintain proper alignment of the bag during the pressure forming processes.

After bag 42 has been filled with carbide mixture, end 49 of bag 42 is sealed to prevent fluid from entering cavity 44 from the exterior region of bag 42. End cap 76 is then attached to end 49 of bag 42. The carbide blank can be pressed into a solid form using a known isostatic press, or a similar device. Mold 60 containing carbide blank is placed in the isostatic press, which utilizes a high pressure liquid, preferably operating at a pressure in excess of 20,000 psi, to apply a generally uniform compressive load to at least a portion of the exterior of mold 60. After compressing carbide blank for a predetermined period of time, the high pressure fluid surrounding mold 60 is discharged and mold 60 is removed from the isostatic press.

The bag 42 containing the compressed green state carbide blank is separated from mold 60. The compressed carbide blank can be placed in a pre-sintering furnace and preheated to a predetermined temperature, for example, 600° F. The core pin 68 disintegrates when heated, leaving behind the curved surfaces, stepped surfaces, point, or arcuate or multi-arcuate cooling channels having radial or axial exits, each depending on the core pin used.

When the core pin used in this method includes coolant channel molds, this method can further comprise inserting a place holder in the hollow channel of the core pin at a point prior to the pressing of the carbide blank and then removing the place holder prior to sintering to ensure the main coolant channel stays open during pressing.

Another embodiment of manufacturing the carbide blank and near-net shaped tool as disclosed herein comprise printing with a 3D printer the core pin and the carbide material together, producing the carbide blank embedded with the core pin in step S20 of FIG. 15. The core pin can be printed with an ink comprising wax or other material as disclosed herein and suitable for use as a core pin with viscosity enabling printing. Ink is prepared from carbide powder with other constituents as needed, such as wax, to print the carbide portion of the blank. As a non-limiting example, wax and carbide powder are used to make a slurry and the viscosity of the slurry is adjusted so that the slurry can be pumped through a 3D printer. The carbide blank having the embedded core pin are printed directly with the 3D printer, with the core pin providing the main cooling channel mold, any axial and/or radial arcuate or linear cooling channel molds, flute molds, step molds, point molds, center indicators, indicator lines and center point molds to be formed in the tool.

The carbide blank will require an increase in density to utilize as a carbide cutting tool. To achieve the requisite density, the carbide blank can be placed in a bag or sleeve such as that described herein with reference to FIG. 13 and pressed in step S22 and sintered in step S24 as disclosed. Alternatively, a bag can be printed around the exterior of the carbide blank during printing of the blank and the core pin. The bag can be printed from wax, for example. The printed carbide blank, core pin and bag can be fitted with the pressure sleeve and pressed or placed directly into the isostatic press and pressed to form a green state carbide blank. The green state carbide blank is pressed to increase its density, and is then heated to remove any remaining wax and harden the tool. The resulting near net shaped tool can then be finish grinded in step S26 to sharpen the cutting edges and any fluting and steps as needed.

As yet another alternative, the carbide blank can be placed directly in the isostatic press and then sintered.

Figure 16:
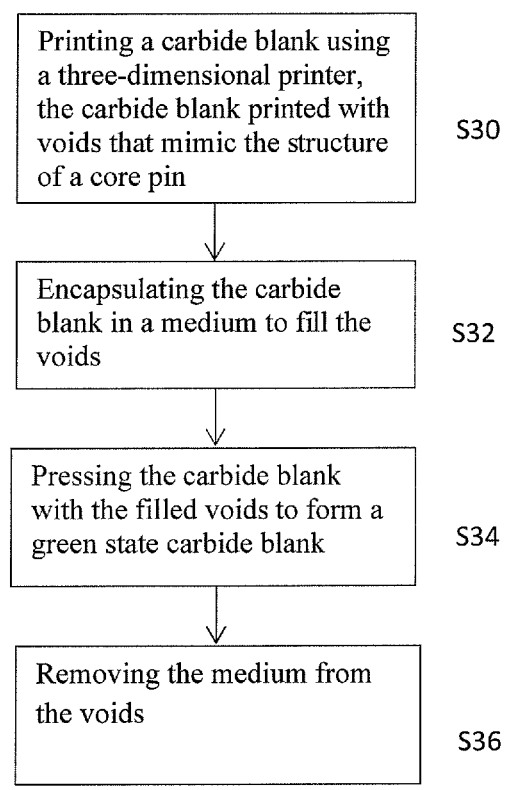
FIG. 16 is a flow diagram of a process of making a near-net shaped tool as disclosed herein.

Another embodiment of a method of making a carbide blank and near-net shaped tool, shown in FIG. 16, comprises printing with a 3D printer in step S30 a carbide blank, wherein the 3D printer does not print the core pin embedded within the carbide material, but rather leaves internal voids that mimic the configuration of the core pin. In other words, the 3D printer prints the carbide blank using only the carbide material ink, with the 3D printer leaving voids where the core pin would have been printed. This carbide blank can be encapsulated in a medium in step S32 to fill all of the voids, the medium melting, vaporizing or otherwise capable of leaving the voids. This encapsulated carbide blank is then pressed in step S34 to achieve the requisite density, and the medium is removed in step S36. The carbide blank can be heated to remove the medium is required.

While various aspects of the mold have been disclosed, it will be appreciated that many other variations may be incorporated without departing from the scope of the present invention. It is intended by the following claims to cover these and any other departures from the disclosed embodiments that fall within the true spirit of the invention. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A device used to form cooling channels and at least a portion of an exterior surface of a cutting tool, the device comprising:
    a core pin configured to be inserted into a cutting tool mold, the core pin comprising:
        a main cooling passage mold configured to create a main cooling passage in the cutting tool; and
    at least one arcuate cooling channel mold configured to create an arcuate cooling channel in the cutting tool, the arcuate cooling channel mold having a first end and a second end, the first end engaging an exterior of the main cooling passage mold, the arcuate cooling channel mold extending non-linearly and away from the main cooling channel mold to form an arc, the second end spaced from the main cooling passage mold and configured to create a coolant exit on one or both of a radial surface and an axial surface of the cutting tool.

2. The device of claim 1, wherein the core pin comprises a plurality of arcuate cooling channel molds, each having a first end engaging the exterior of the main cooling passage mold and a second end configured to create a respective coolant exit on one or both of the radial surface and the axial surface of the cutting tool.

3. The device of claim 2, wherein first ends of the plurality of arcuate cooling channel molds are arranged in a helical configuration around the main cooling passage mold, and second ends of the plurality of arcuate cooling channel molds are configured to create coolant exits on the axial surface of the cutting tool at varying locations around and longitudinally along the axial surface.

4. The device of claim 2, wherein the core pin further comprises at least one indicator line engaged with some of second ends of the plurality of arcuate cooling channel molds creating a helical structure spaced from and spiraling around the main cooling passage mold and configured to produce a grinding guide.

5. The device of claim 1, wherein the core pin further comprises at least one fluted mold section engaged with the second end of the at least one arcuate cooling channel mold, the at least one fluted mold section extending parallel to a longitudinal axis and separated from the main cooling passage mold.

6. The device of claim 1, further comprising a centering member at a first end of the core pin configured to center the main cooling passage mold along a longitudinal axis, the centering member having an opening to allow material to pass through the core pin.

7. The device of claim 6, wherein a second end of the core pin has a diameter equal to a diameter of the centering member to center the core pin in a bag for pressing.

8. The device of claim 1, wherein the main cooling passage mold has a hollow center, the core pin further comprising a place holder configured to be inserted into the hollow channel and removed from the hollow channel.

9. The device of claim 1, wherein the core pin further comprises at least one flute configured as an inverse shape of at least a portion of the cutting tool.

10. The device of claim 1, wherein the core pin further comprises a center indicator formed on one of a first end and a second end of the core pin configured to leave a center mark on the cutting tool.

11. A device used to create a cutting tool comprising:
a core pin for molding the cutting tool, the core pin comprising:
a base having an overall diameter;
at least one fluted mold section extending from the base and configured to form an inverse shape of at least a portion of the cutting tool; a main cooling passage mold; and at least one arcuate cooling channel mold having a first end and a second end, the first end engaging the main cooling passage mold, the at least one arcuate cooling channel mold extending non-linearly and away from the main cooling channel mold to form an arc, and second end spaced from the main cooling passage mold.

12. The device of claim 11, further comprising a
a main cooling passage mold; and
at least one arcuate cooling channel mold having a first end and a second end, the first end engaging the main cooling passage mold, the arcuate strip extending non-linearly and away from the main cooling channel mold to form an arc, and the second end spaced from the main cooling passage mold.

13. The device of claim 11, wherein an area of the core pin is embossed with insignia configured to transfer the insignia to the cutting tool.

14. A device used to create a cutting tool comprising:
a core pin used as an insert into a mold to create the cutting tool, the core pin comprising:
a step mold comprising:
a first inclined surface inclining from a center of the mold to a first point on a plane between the center of the mold and an outer diameter of the mold;
a second inclined surface spaced along a longitudinal axis of the core pin from the first inclined surface and inclining from a second point on the plane to the outer diameter of the mold; and
a wall extending between the first point and the second point, the wall extending parallel to the longitudinal axis, wherein the step mold is configured to form an axial surface with a stepped diameter having a diameter smaller than an overall diameter an outer axial surface of the core pin, and a radial surface between the axial surface and the outer axial surface.

15. The device of claim 14, wherein the step mold is configured as an inverse shape of a tip of the cutting tool.

16. A device used to create a cutting tool comprising:
a core pin configured as an insert into a mold to create the cutting tool, the core pin comprising:
a main cooling passage mold in a shape of a shaft; and
at least one arcuate cooling channel mold in the shape of an arcuate strip having a first end engaging an exterior of the main cooling passage mold, the arcuate strip extending non-linearly and away from the main cooling channel mold to form an arc, and a second end spaced from the main cooling passage mold.

* * * * *